United States Patent [19]
Nishimura et al.

[11] Patent Number: 6,050,028
[45] Date of Patent: Apr. 18, 2000

[54] APPARATUS FOR CONTROLLING CLOSING MOTION OF VEHICULAR SLIDING DOOR

[75] Inventors: Narumichi Nishimura, Mooka; Mitsuru Hirai, Utsunomiya, both of Japan

[73] Assignee: Honda Giken Kogyo Kabushiki Kaisha, Tokyo, Japan

[21] Appl. No.: 09/083,719

[22] Filed: May 22, 1998

[30] Foreign Application Priority Data

May 22, 1997 [JP] Japan ................................. 9-131920

[51] Int. Cl.⁷ ........................................................ E05F 15/00
[52] U.S. Cl. ........................................................ 49/280
[58] Field of Search ............................ 49/279, 280, 281, 49/282, 285, 286, 289

[56] References Cited

U.S. PATENT DOCUMENTS 4,617,757 10/1986 Kagiyama et al. ........................ 49/280
4,640,050 2/1987 Yamagishi et al. ........................ 49/280
5,063,710 11/1991 Schap ........................................ 49/280
5,434,487 7/1995 Long .

FOREIGN PATENT DOCUMENTS 6344773 12/1994 Japan .

*Primary Examiner*—Jerry Redman
*Attorney, Agent, or Firm*—Carrier, Blackman & Associates, P.C.; Joseph P. Carrier; William D. Blackman

[57] ABSTRACT

An apparatus for controlling the closing motion of a vehicular sliding door has a track extending in a longitudinal direction of a motor vehicle body, a sliding door panel movable in opening and closing directions along the track by an actuator unit, an operating unit mounted on an inner lower side of the sliding door panel and operable in response to movement of a handle on the sliding door panel, and a drive signal generator mounted on the track at an open position of the sliding door panel, for generating a drive signal to energize the actuator unit to move the sliding door panel in a closing direction when the operating unit operates.

7 Claims, 8 Drawing Sheets

APPARATUS FOR CONTROLLING CLOSING MOTION OF VEHICULAR SLIDING DOOR

BACKGROUND OF THE INVENTION

1. Field of the Invention

The present invention relates to an apparatus for controlling the closing motion of a vehicular sliding door from an open position to a closed position with an actuator.

2. Description of the Related Art

Some motor vehicles incorporate a so-called power sliding door which can be opened and closed by an actuator such as an electric motor. The power sliding door includes a motor unit for opening and closing a door panel, the motor unit being mounted on a vehicle body and operatively coupled to the door panel by an endlessly looped cable.

If the motor unit is supplied with electric energy at all times, then it makes the power sliding door relatively costly because of its energy consumption even when the door panel remains closed. To avoid the above drawback, the power sliding door is generally of such a type that only when the door panel is closed, electric energy is supplied to the motor unit in response to a signal from the door panel. Therefore, an external switch is required to energize the motor unit when the door panel is to move from the open position to the closed position.

In order to eliminate an external switch and allow the door panel to start being power-operated with a manual initiating action from outside of the motor vehicle, there has been developed a vehicular door controller as disclosed in Japanese laid-open patent publication No. 6-344773, for example. The disclosed vehicular door controller has an electric power unit for selectively moving the door panel in an opening direction to an open position or in a closing direction to a closed position, a detector for detecting a door motion in either the opening direction or the closing direction, and an operating unit for energizing the electric power unit to move the door in either the opening direction or the closing direction depending on the detected door motion.

While the detector can detect a door motion in either the opening direction or the closing direction, it is unable to identify whether the door motion is manually triggered or caused by an accidental force such as a shock. Usually, therefore, the operating unit starts energizing the electric power unit after the door panel has continuously moved a certain distance. As a result, a person who wants to open or close the door panel needs to move the door panel, which is relatively heavy, for a relatively long distance until the electric power unit starts being turned on. The person is thus subject to an excessive load in opening or closing the door panel.

SUMMARY OF THE INVENTION

It is a major object of the present invention to provide an apparatus for controlling the closing motion of a vehicular sliding door based on reliable detection of a manually triggered door motion through relatively simple arrangement and operation.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
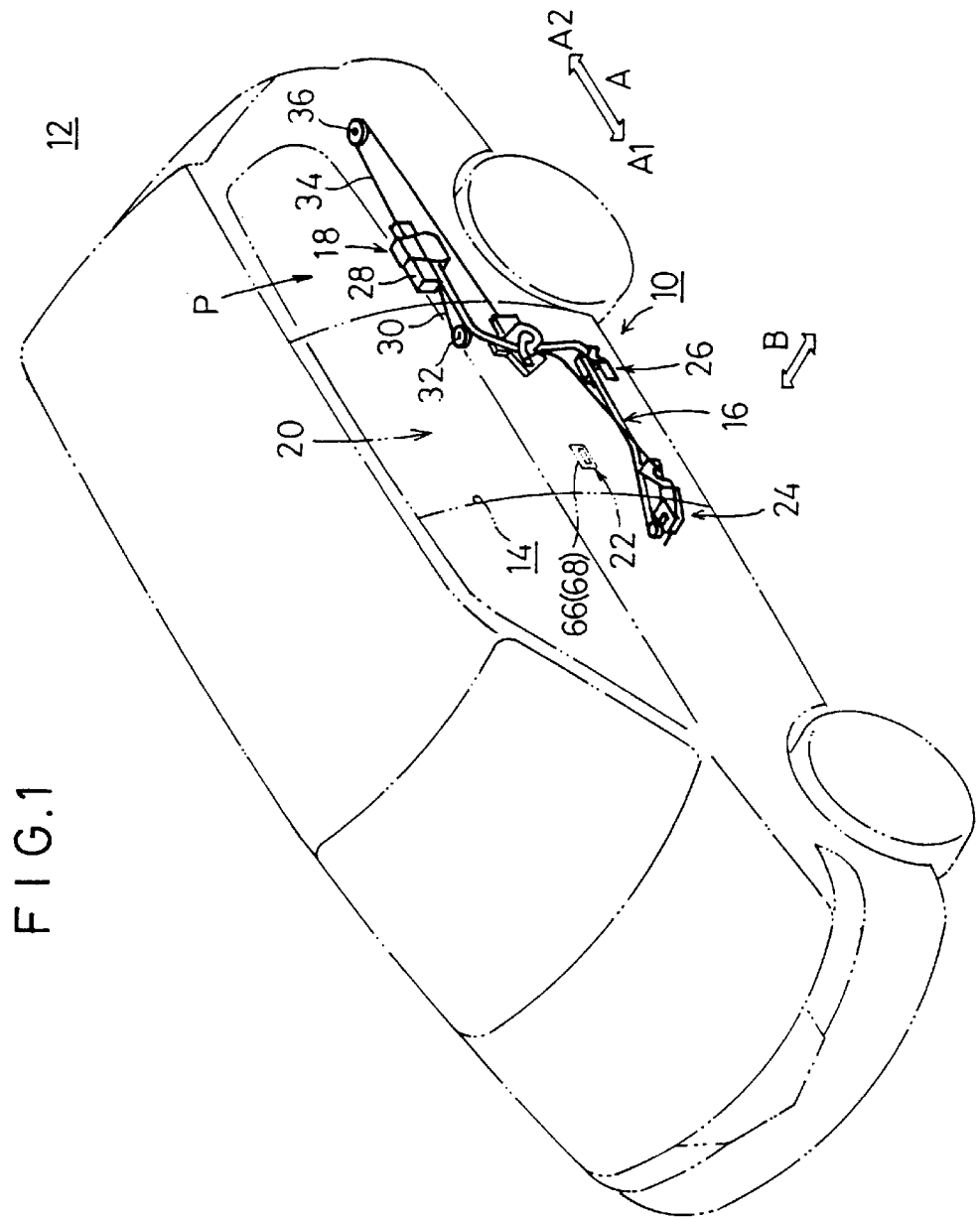
FIG. 1 is a perspective view of a motor vehicle body which incorporates a closing motion control apparatus according to a first embodiment of the present invention.

FIG. 1 shows a motor vehicle body 12 which incorporates a closing motion control apparatus 10 according to a first embodiment of the present invention.

As shown in FIG. 1, the closing motion control apparatus 10 comprises a track 16 positioned below a door opening 14 in the motor vehicle body 12 and extending in the longitudinal direction (indicated by the arrow A) of the motor vehicle body 12, a sliding door panel 20 movable in opening and closing directions indicated by the arrows A1, A2 along the track 16 with an actuator unit (actuating means) 18, an operating unit 24 mounted on an inner lower side of the sliding door panel 20 and operable in response to movement of a handle 22 on the sliding door panel 20 for opening and closing the sliding door panel 20, and a drive signal generator 26 mounted on the track 16 at an open position P of the sliding door panel 20, for generating a drive signal to energize the actuator unit 18 to move the sliding door panel 20 in a closing direction indicated by the arrow A1 when the operating unit 24 operates.

The actuator unit 18 comprises an electric motor 28 having an output shaft on which a pair of reels is coupled. One of the reels is connected to an end of a cable 30 which is trained around a pulley 32 and has an opposite end fixed to the sliding door panel 20. The other reel is connected to an end of a cable 34 which is trained around a pulley 36 and has an opposite end fixed to the sliding door panel 20. When the cable 30 is wound around the reel connected thereto which is rotated by the electric motor 28, the sliding door panel 20 moves in the closing direction indicated by the arrow A1. When the cable 34 is wound around the reel connected thereto which is rotated by the electric motor 28, the sliding door panel 20 moves in the opening direction indicated by the arrow A2.

Figure 3:
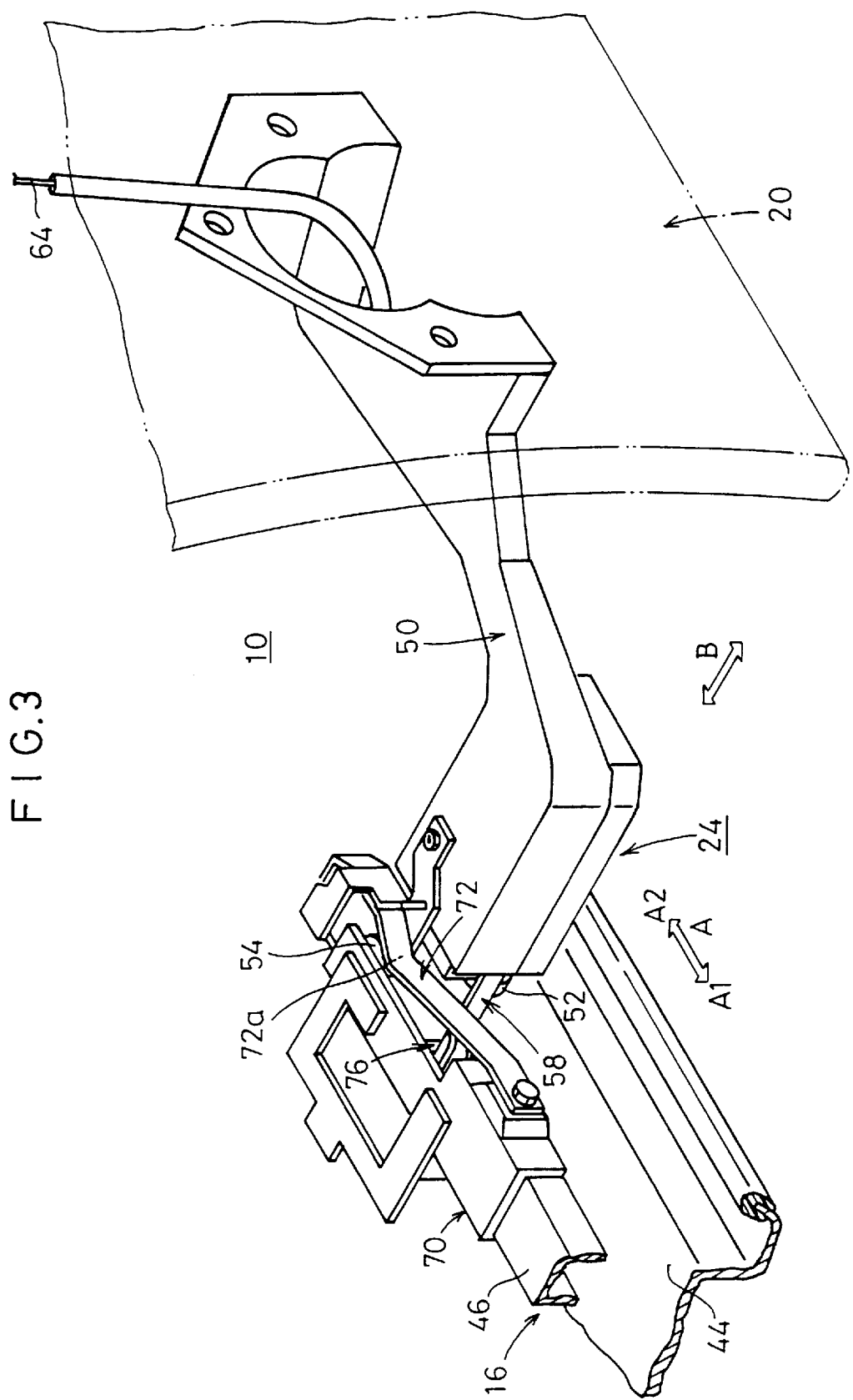
FIG. 3 is an enlarged perspective view of the operating unit and the drive signal generator.

The track 16 is curved transversely outwardly in a direction indicated by the arrow B from its tip end in the direction indicated by the arrow A1 toward the rearward direction indicated by the arrow A2, and extends rearward to a certain position in the longitudinal direction of the motor vehicle body 12. As shown in FIG. 3, the track 16 comprises a lower roller engagement plate 44 extending horizontally and an upper rail 46 extending in the direction indicated by the arrow A and having a substantially channel-shaped cross section.

Figure 2:
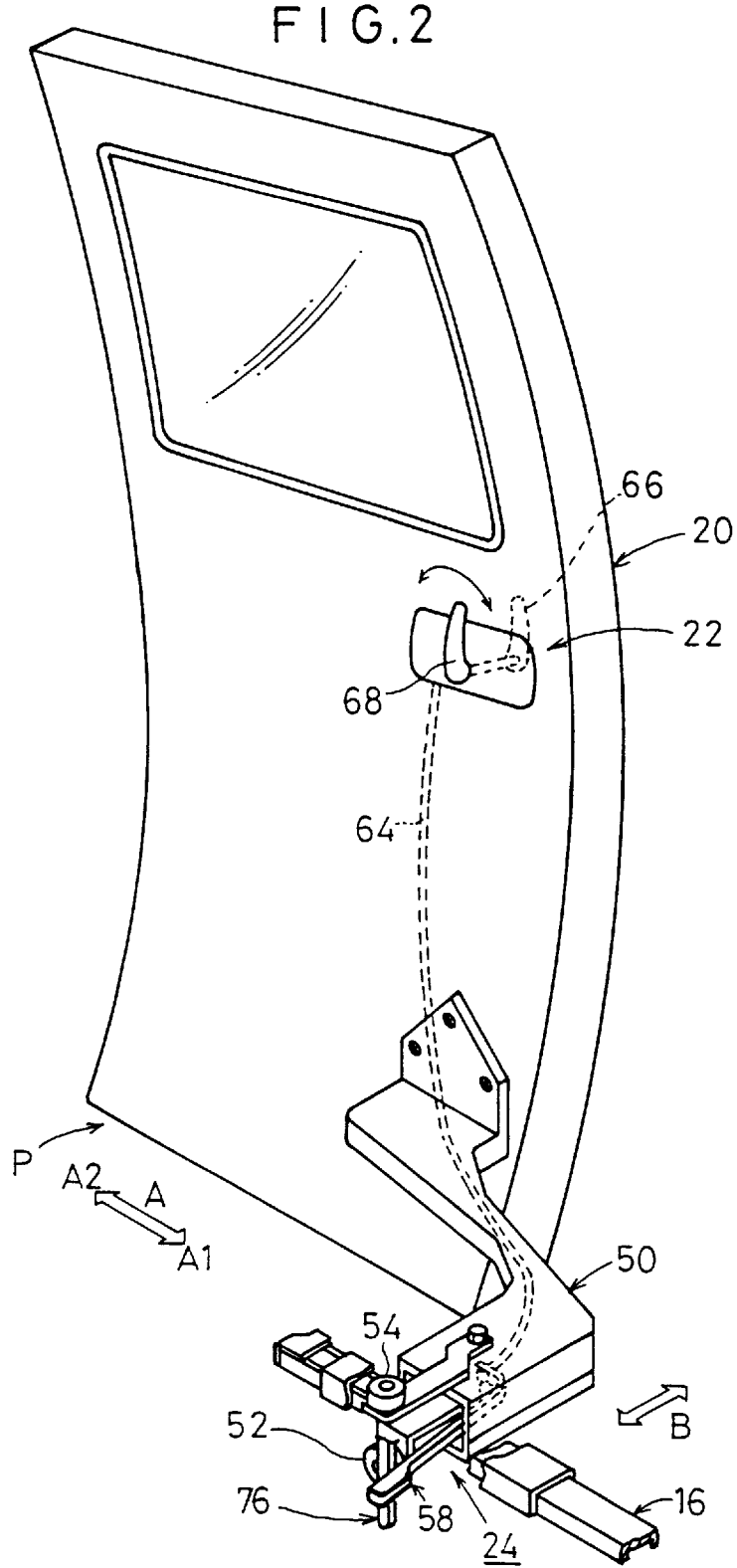
FIG. 2 is a perspective view of an operating unit and a drive signal generator of the closing motion control apparatus according to the first embodiment.

As shown in FIGS. 2 and 3, the operating unit 24 has a roller bracket 50 fixed to the inner lower side of the sliding door panel 20. On an inner end of the roller bracket 50, there are rotatably supported a first roller 52 held in rolling engagement with the roller engagement plate 44 of the track 16 and a second roller 54 held in rolling engagement with the rail 46 of the track 16.

Figure 4:
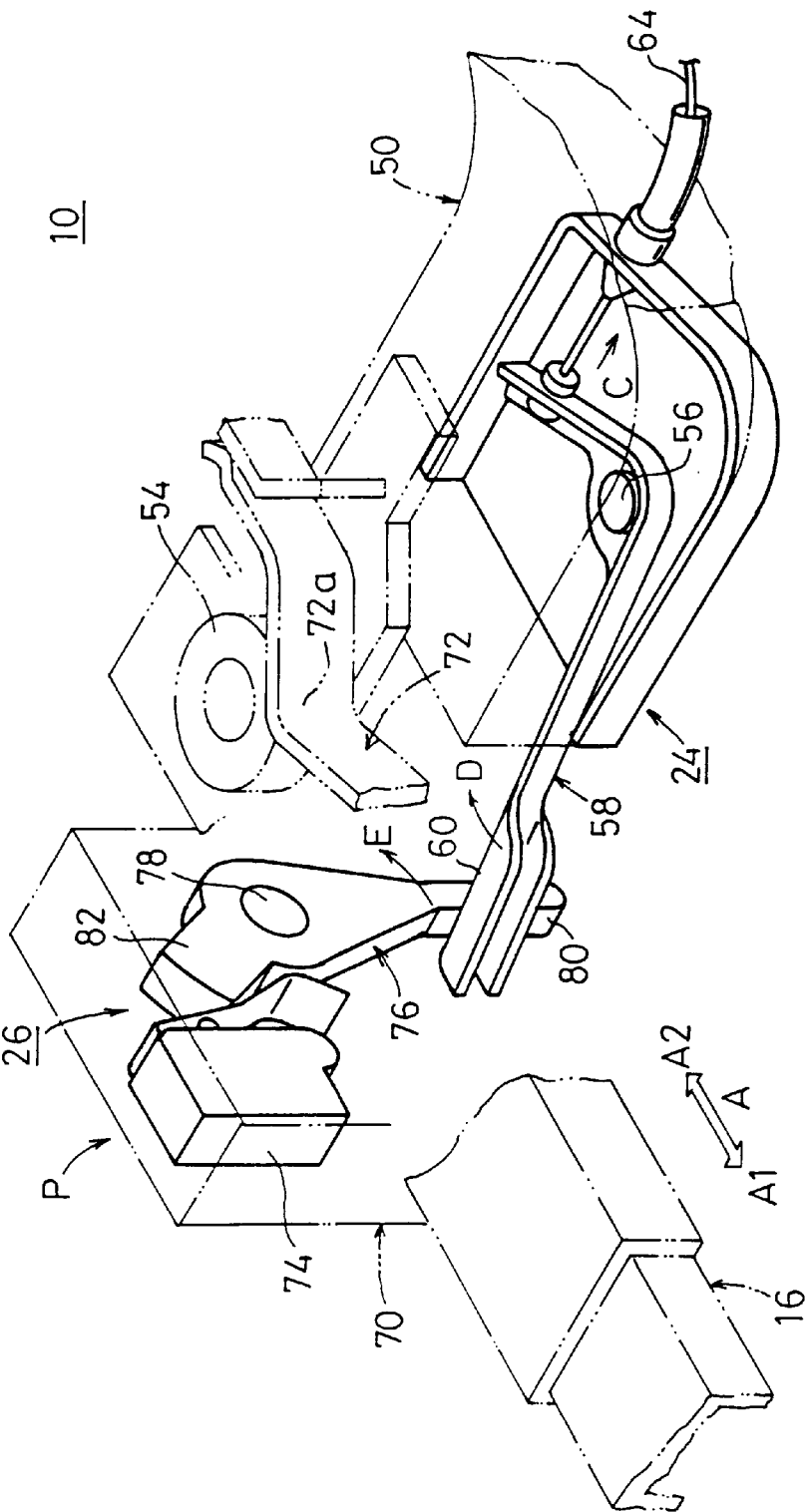
FIG. 4 is an enlarged perspective view of an internal structure of the operating unit and the drive signal generator.
Figure 5:
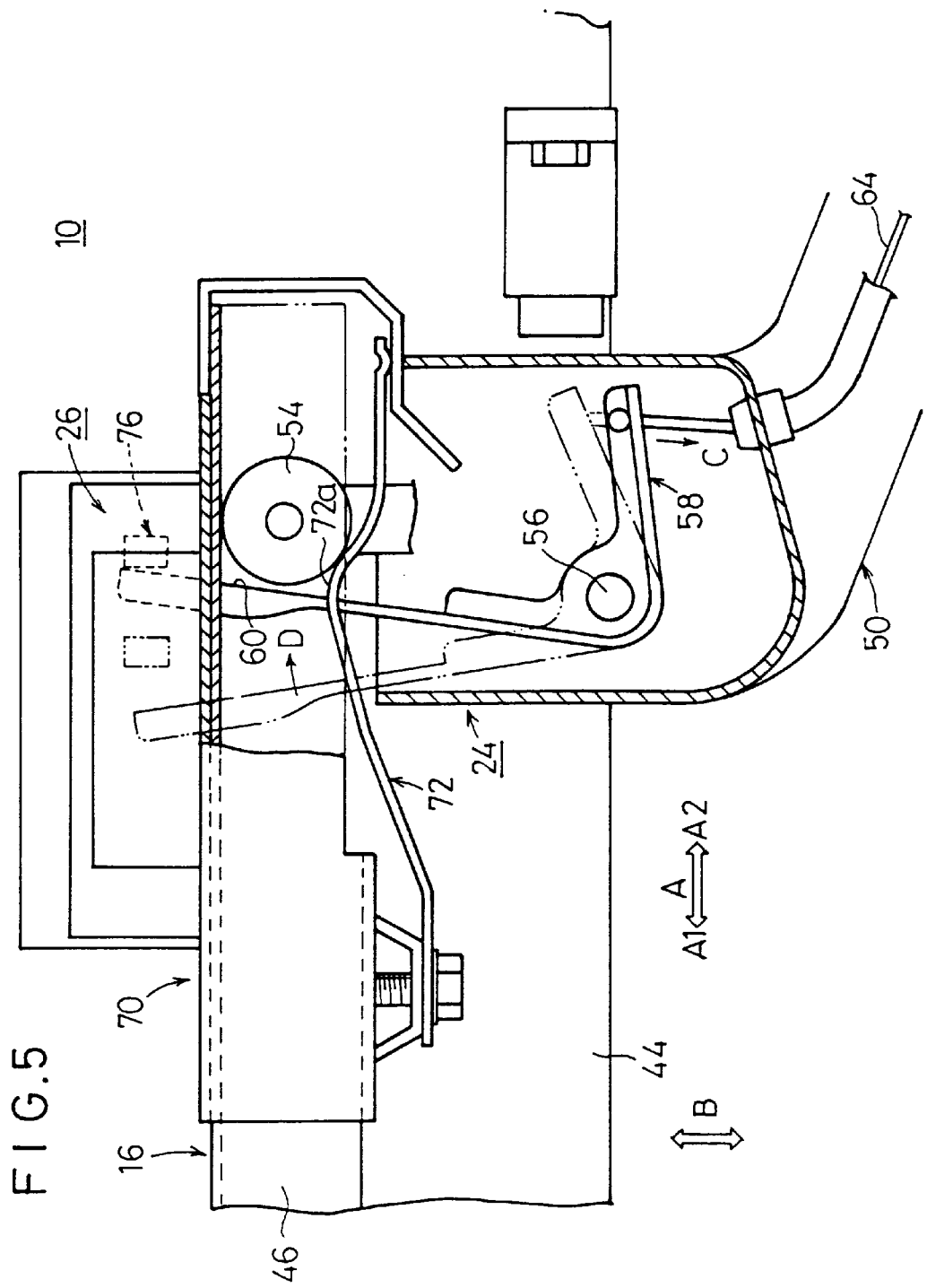
FIG. 5 is a plan view, partly cut away, showing the manner in which the operating unit operates.

As shown in FIGS. 4 and 5, a trip lever 58 is swingably mounted by a shaft 56 in the inner end of the roller bracket 50. The trip lever 58 is angularly movable about the shaft 56 in the direction indicated by the arrow A. The trip lever 58 is made of a metal such as iron, and includes a longer arm having an end portion of U-shaped cross section which has a curved surface 60 facing and engageable with a switch actuating lever 76 (described later on) of the drive signal generator 26.

The trip lever 58 also has a shorter arm disposed in the roller bracket 50 and fixed to an end of the cable 64 which extends through the roller bracket 50 upwardly in the sliding door panel 20. As shown in FIG. 2, the cable 64 has an opposite end connected to an outer handle knob 66 of the handle 22 which is mounted on an outer surface of the sliding door panel 20 and an inner handle knob 68 of the handle 22 which is mounted on an inner surface of the sliding door panel 20.

A bracket 70 is mounted on the track 16 at the open position P of the sliding door panel 20. As shown in FIG. 5, a leaf-spring stop 72 is fastened to an outer surface of the bracket 70 by a screw, and has a bent portion 72a projecting into the track 16. When the second roller 54 mounted on the roller bracket 50 contacts the bent portion 72a, the sliding door panel 20 is prevented from moving unnecessarily in the closing direction indicated by the arrow A1.

The drive signal generator 26 is mounted in the bracket 70. The drive signal generator 26 comprises a microswitch (sensor) 74 disposed in an upper portion of the bracket 70, and the switch actuating lever 76 angularly movably mounted in the bracket 70 and extending into the track 16. When the switch actuating lever 76 is pushed by the trip lever 58, the switch actuating lever 76 moves in the direction indicated by the arrow A to turn on the microswitch 74. As shown in FIG. 4, the switch actuating lever 76 is angularly movably supported in the bracket 70 by a shaft 78, and comprises a long arm 80 extending downwardly and a dog 82 extending substantially upwardly for turning on the microswitch 74. The switch actuating lever 76 is made of a material softer than the trip lever 58, such as a resin material, for example.

Operation of the closing motion control apparatus 10 according to the first embodiment will be described below.

For opening the sliding door panel 20 from the closed position, the outer handle knob 66 or the inner handle knob 68 is manually turned. Then, a drive signal is generated to energize the electric motor 28 of the actuator unit 18 to wind the cable 34 around the reel connected thereto, moving the sliding door panel 20 connected to the cable 34 in the opening direction indicated by the arrow A2.

Figure 6:
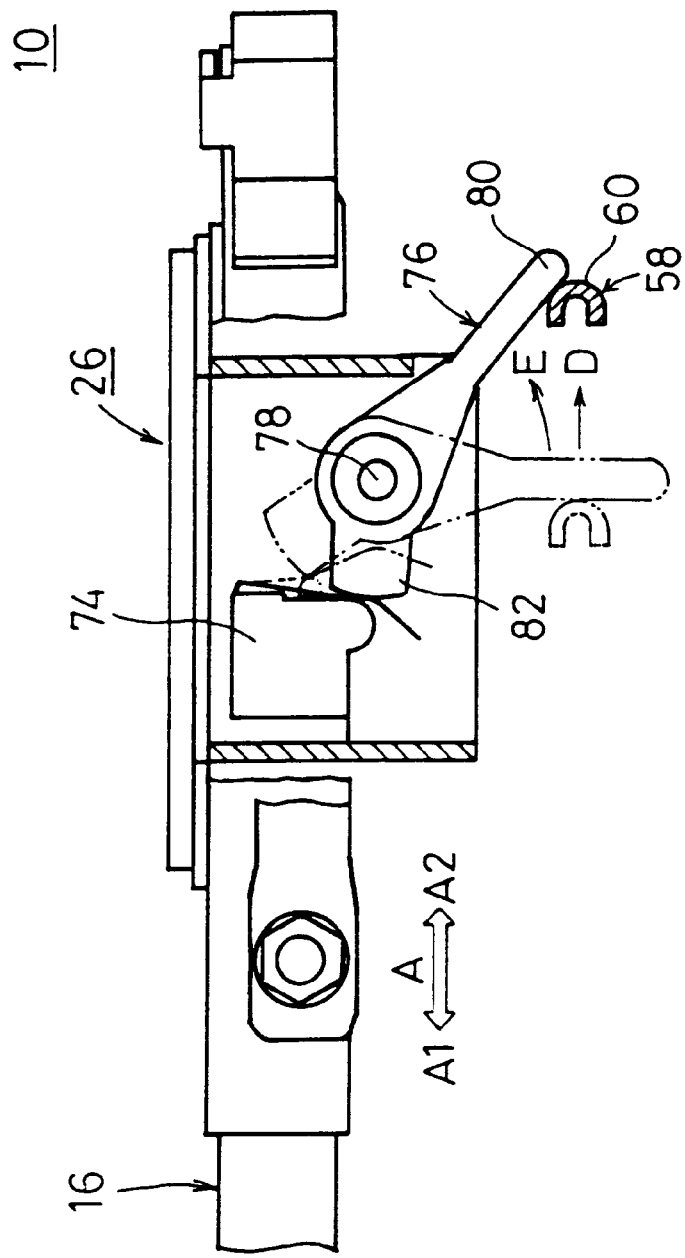
FIG. 6 is a side elevational view, partly cut away, showing the manner in which the drive signal generator operates.

For closing the sliding door panel 20 from the open position P, the outer handle knob 66 or the inner handle knob 68 is manually turned. The cable 64 is pulled in the direction indicated by arrow C (see FIGS. 4 and 5), angularly moving the trip lever 58 about the shaft 56 in the direction indicated by the arrow D. When the trip lever 58 is turned in the direction indicated by the arrow D, the switch actuating lever 76 on the motor vehicle body 12 at the open position P is pushed in the direction indicated by the arrow A2, and turned about the shaft 78 in the direction indicated by the arrow E, causing the dog 82 to turn on the microswitch 74 (see FIG. 6).

The microswitch 74 transmits a drive signal to the electric motor 28, which winds the cable 30 around the reel connected thereto. The sliding door panel 20 connected to the cable 30 is now moved in the closing direction indicated by the arrow Al, and hence is smoothly closed on the motor vehicle body 12.

The electric motor 28 is automatically controlled to reverse its direction of rotation after the sliding door panel 20 has moved in one direction, i.e., the closing direction or the opening direction.

In the first embodiment, when the handle 22 is turned while the sliding door panel 20 is being closed, the trip lever 58 and the switch actuating lever 76 are operated to turn on the microswitch 74, which then energizes the actuator unit 18 to open the sliding door panel 20. Therefore, even when the sliding door panel 20 is moved in the closing direction from the open position P under an accidental force such as an external shock, the microswitch 74 is not turned on, and hence the actuator unit 18 is not energized.

Accordingly, the closing motion control apparatus 10 can immediately and reliably distinguish between a movement of the sliding door panel 20 initiated by a manual action and a movement of the sliding door panel 20 under an accidental external force. The actuator unit 18 can thus be accurately energized to cause the sliding door panel 20 to be opened and closed smoothly and reliably on the basis of the intention of a person who wants to open and close the sliding door panel 20.

In the first embodiment, furthermore, the operating unit 24 is housed in the roller bracket 50 on the inner lower surface of the sliding door panel 20, and the trip lever 58 projects into the track 16. The switch actuating lever 76 of the drive signal generator 26 fixed to the track 16 projects into the track 16. Therefore, insofar as the sliding door panel 20 is closed on the motor vehicle body 12, the operating unit 24 and the drive signal generator 26 are isolated from the exterior by the track 16 and the sliding door panel 20, and hence are free from rainwater, mud, and dust while the motor vehicle body 12 is running. As a consequence, the operating unit 24 and the drive signal generator 26 are protected from damage, and the microswitch 74 is also protected from short-circuiting or the like.

The operating unit 24 has the trip lever 58 angularly movable by the handle 22, and the drive signal generator 26 has the switch actuating lever 76 angularly movable when pressed by the trip lever 58 and the microswitch 74 actuatable by the switch actuating lever 76. Therefore, the closing motion control apparatus 10 is highly simple in its entirety, and can operate reliably with minimum failure possibilities. The trip lever 58 and the switch actuating lever 76 which are angularly movable do not need to be positioned highly accurately.

The trip lever 58 includes the end portion of U-shaped cross section which has the curved surface 60 engageable with the switch actuating lever 76. The curved surface 60 is effective to avoid appreciable damage to the switch actuating lever 76 when in contact therewith. While the trip lever 58 is preferably made of a metal, the switch actuating lever 76 is preferably made of a material softer than the trip lever 58. Therefore, impact noise produced when the trip lever 58 hits the switch actuating lever 76 is very low in level.

The bracket 70 with the stop 72 fixed thereto is secured to the track 16, and the drive signal generator 26 is mounted in the bracket 70. Therefore, the drive signal generator 26 can easily be positioned without positional errors simply when the bracket 70 is secured to the track 16.

Figure 7:
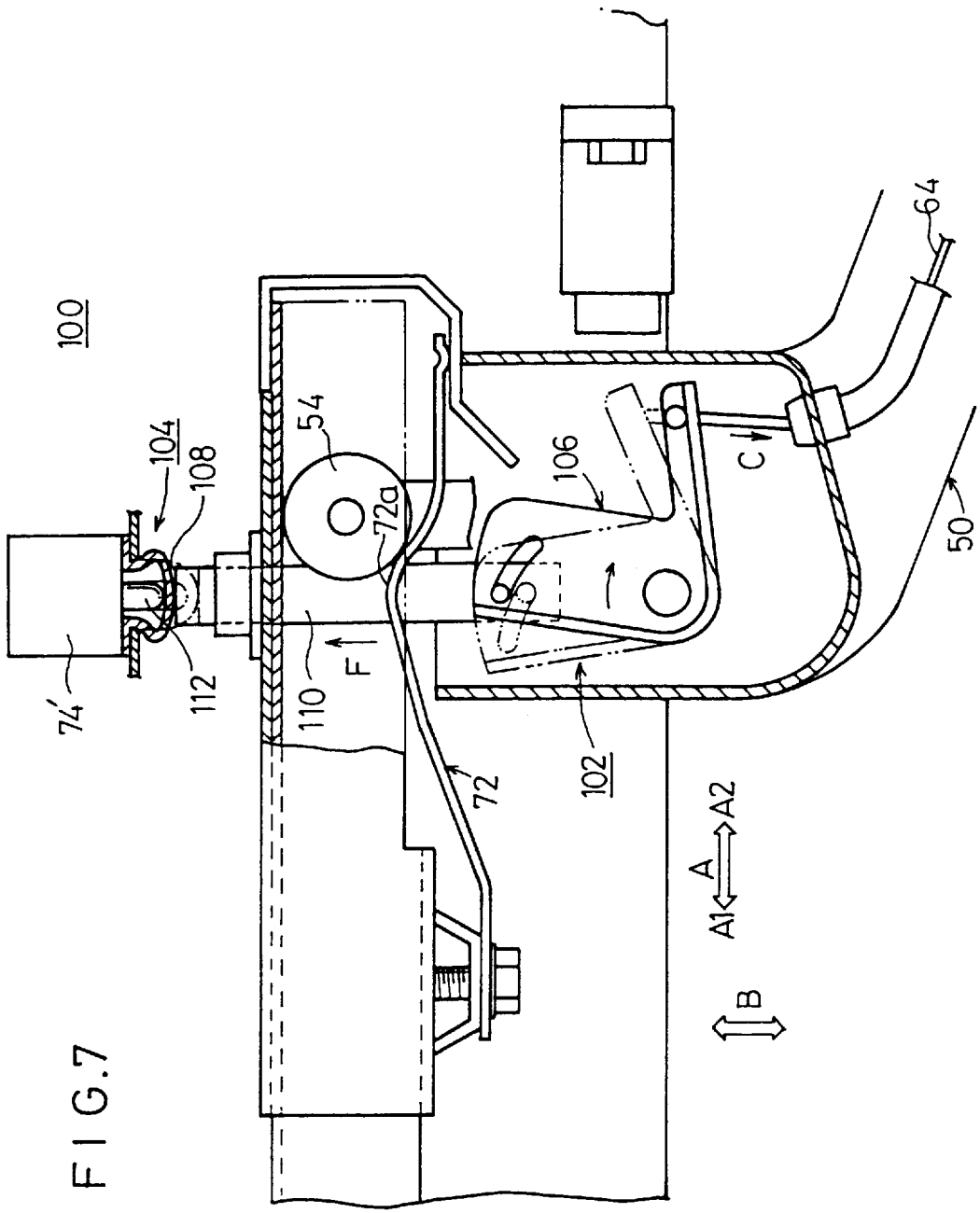
FIG. 7 is a plan view, partly cut away, of a closing motion control apparatus according to a second embodiment of the present invention.

FIG. 7 shows a closing motion control apparatus 100 according to a second embodiment of the present invention. Those parts shown in FIG. 7 which are identical to those of the closing motion control apparatus 10 according to the first embodiment are denoted by identical reference characters, and will not be described in detail below.

The closing motion control apparatus 100 includes an operating unit 102 and a drive signal generator 104. The operating unit 102 has an angularly movable link 106 connected to the cable 64. The link 106 is operatively connected to a first pusher 110 having a pressing surface 108 which is pushed in the direction indicated by the arrow F when the cable 64 is pulled in the direction indicated by the arrow C by the handle 22 on the sliding door panel 20. The drive signal generator 104 has a second pusher 112 disposed outside of the track 16 for actuating a sensor such as the microswitch 74' disposed outside of the track 16 when the pressing surface 108 is pushed in the direction indicated by the arrow F.

When the handle 22 on the sliding door panel 20 is turned while the sliding door panel 20 is in the open position P, the cable 64 is pulled in the direction indicated by the arrow C. The link 106 of the operating unit 102 is angularly moved to move the first pusher 110 toward the drive signal generator 104 in the direction indicated by the arrow F. The pressing surface 108 of the first pusher 110 presses the second pusher 112 in the direction indicated by the arrow F, causing the second pusher 112 to turn on the microswitch 74'.

In the second embodiment, only when the handle 22 is turned to turn on the microswitch 74, the actuator unit 18 is supplied with a drive signal and energized to close the sliding door panel 20. The actuator unit 18 is not energized when the sliding door panel 20 is accidentally moved under external forces due to shocks or the like. The closing motion control apparatus 100 according to the second embodiment offers the same advantages as those of the closing motion control apparatus 10 according to the first embodiment.

According to the second embodiment, particularly, the closing motion control apparatus 100 has the first pusher 110 having the pressing surface 108 movable in the direction indicated by the arrow F when the handle 22 is turned, and the second pusher 112 movable by the pressing surface 108 in the direction indicated by the arrow F to turn on the microswitch 74'. The operating unit 102 and the drive signal generator 104 are relatively small in overall size and are prevented from operating in error.

Figure 8:
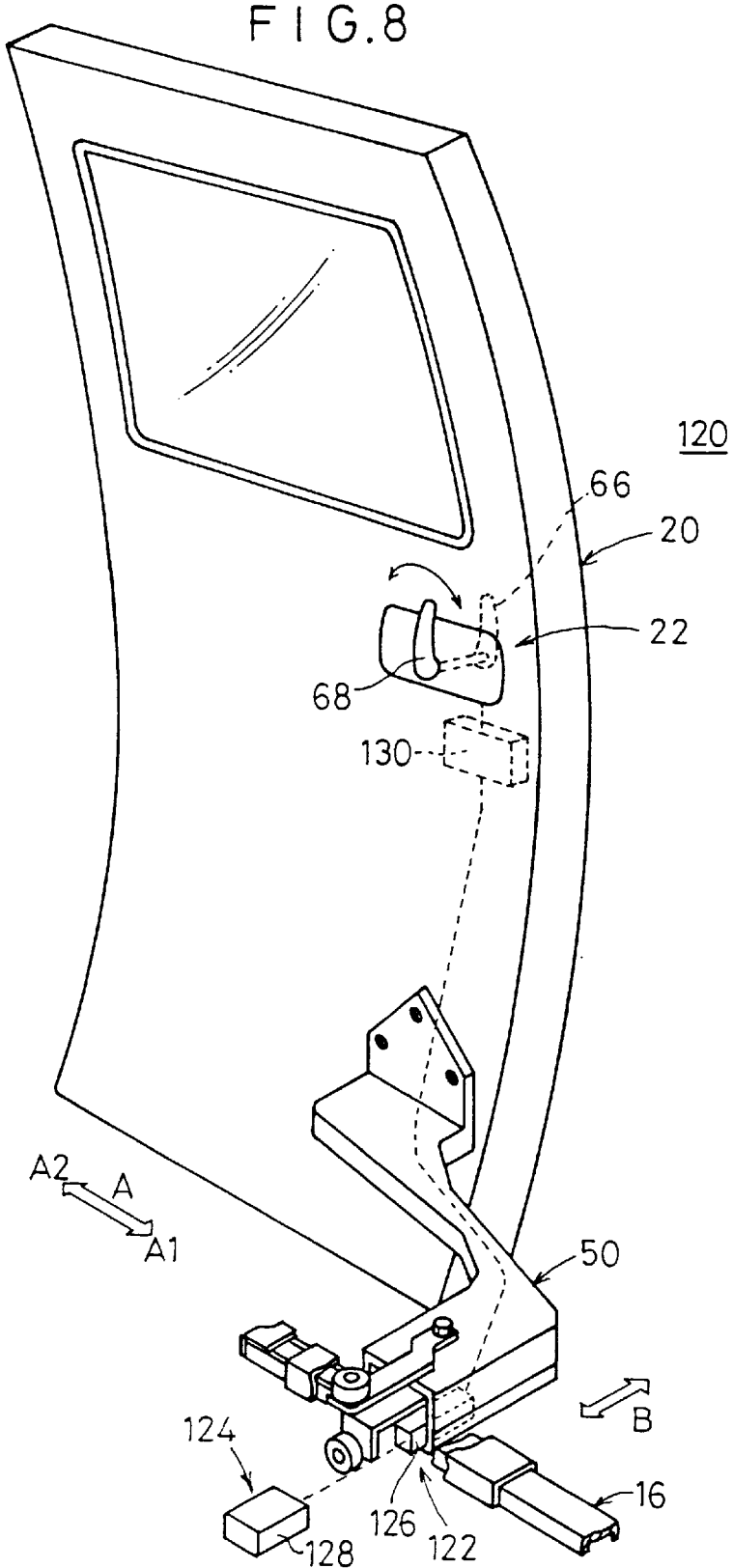
FIG. 8 is a perspective view of an operating unit and a drive signal generator of a closing motion control apparatus according to a third embodiment of the present invention.

FIG. 8 shows a closing motion control apparatus 120 according to a third embodiment of the present invention. Those parts shown in FIG. 8 which are identical to those of the closing motion control apparatus 10 according to the first embodiment are denoted by identical reference characters, and will not be described in detail below.

The closing motion control apparatus 120 includes an operating unit 122 and a drive signal generator 124. The operating unit 122 is mounted on the sliding door panel 20 and has a signal transmitter 126 disposed in the roller bracket 50 for generating a door closing drive signal when the handle 22 is turned. The drive signal generator 124 has a signal receiver 128 for detecting a door closing drive signal generated by the signal transmitter 126. The sliding door panel 20 houses therein a power supply 130 such as a battery or a charger for supplying electric energy to the signal transmitter 126.

The closing motion control apparatus 120 thus has a signal transmission and reception system including the signal transmitter 126 which generates a door closing drive signal when the handle 22 is turned, and the signal receiver 128 which detects a door closing drive signal generated by the signal transmitter 126. Consequently, the closing motion control apparatus 120 is highly small in size, and prevented from operating in error. The closing motion control apparatus 120 according to the third embodiment offers the same advantages as those of the closing motion control apparatus 10, 100 according to the first and second embodiments.

As described above, the closing motion control apparatus according to the present invention has the operating unit mounted on the sliding door panel movable back and forth on the track and operable when the handle on the sliding door panel is turned, and the drive signal generator mounted on the track at the open position of the sliding door panel, for generating a drive signal to energize the actuator unit to move the sliding door panel in the closing direction or the opening direction when the operating unit operates. Since the actuator unit is energized only on the basis of the intention of a person who turns the handle, the actuator unit will not be energized even when the sliding door panel is accidentally moved under external forces. Therefore, the sliding door panel can be opened and closed smoothly and reliably based on the intention of a person who wants to open and close the sliding door panel.

Although certain preferred embodiments of the present invention have been shown and described in detail, it should be understood that various changes and modifications may be made therein without departing from the scope of the appended claims.

What is claimed is:

1. An apparatus for controlling closing motion of a vehicular sliding door, comprising:

a track positioned below a door opening in a motor vehicle body and extending in a longitudinal direction of the motor vehicle body;

a sliding door panel movable in opening and closing directions along said track;

actuating means for moving said sliding door panel;

an operating unit mounted on an inner lower side of said sliding door panel and operable in response to movement of a handle on said sliding door panel for closing the sliding door panel;

a drive signal generator mounted on said track at an open position of said sliding door panel, for generating a drive signal to energize said actuating means to move said sliding door panel in a closing direction when said operating unit operates; and a cable, said operating unit being connected to said handle by said cable;

said operating unit comprising:
a trip lever connected to said cable and angularly movable in said longitudinal direction within said track when said handle is moved; and said drive signal generator comprising:
a sensor disposed outside of said track; and
an actuating lever inserted in said track and angularly movable in said longitudinal direction for actuating said sensor in response to being pressed by said trip lever.

2. An apparatus according to claim 1, wherein said operating unit has a roller bracket fixed to the inner lower side of said sliding door panel, a pair of rollers rotatably supported on a distal end of said roller bracket in rolling engagement with said track, said trip lever being angularly movably supported in the distal end of said roller bracket.

3. An apparatus according to claim 1, wherein said trip lever has a portion of U-shaped cross section which has a curved surface facing and engageable with said actuating lever.

4. An apparatus according to claim 1, wherein one of said trip lever and said actuating lever is made of a material softer than the material of the other of said trip lever and said actuating lever.

5. An apparatus according to claim 1, further comprising a bracket mounted on said track and a stop mounted on said bracket for holding said sliding door panel in the open position thereof, said drive signal generator being secured to said bracket.

6. An apparatus for controlling closing motion of a vehicular sliding door, comprising:

a track positioned below a door opening in a motor vehicle body and extending in a longitudinal direction of the motor vehicle body;

a sliding door panel movable in opening and closing directions along said track;

actuating means for moving said sliding door panel;

an operating unit mounted on an inner lower side of said sliding door panel and operable in response to movement of a handle on said sliding door panel for closing the sliding door panel;

a drive signal generator mounted on said track at an open position of said sliding door panel, for generating a drive signal to energize said actuating means to move said sliding door panel in a closing direction when said operating unit operates; and a cable, said operating unit being connected to said handle by said cable;

said operating unit comprising:

a first pusher movable in said track when said handle is moved; and said drive signal generator comprising:

a sensor disposed outside of said track; and a second pusher disposed outside of said track and movable for actuating said sensor in response to being pressed by said first pusher.

7. An apparatus according to claim 6, wherein said operating unit has a roller bracket fixed to the inner lower side of said sliding door panel, a pair of rollers rotatably supported on a distal end of said roller bracket in rolling engagement with said track, and a link connected to said cable and angularly movably supported in the distal end of said roller bracket, said first pusher being operatively coupled to said link.

* * * * *

UNITED STATES PATENT AND TRADEMARK OFFICE
CERTIFICATE OF CORRECTION

PATENT NO. : 6,050,028
DATED : April 18, 2000
INVENTOR(S) : Narumichi Nishimura, Mitsuru Hirai It is certified that error appears in the above-identified patent and that said Letters Patent is hereby corrected as shown below:

Column 5, line 30, change "74" to --74'--.

Signed and Sealed this

Twenty-seventh Day of February, 2001

Attest:

NICHOLAS P. GODICI

*Attesting Officer*    *Acting Director of the United States Patent and Trademark Office*